March 6, 1956     W. M. NICKEY     2,736,985
MOUSE TRAP
Filed June 25, 1953     2 Sheets-Sheet 1
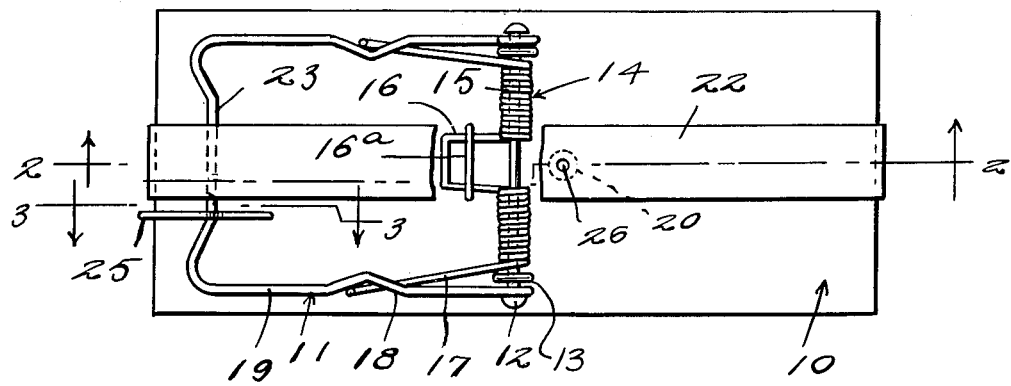
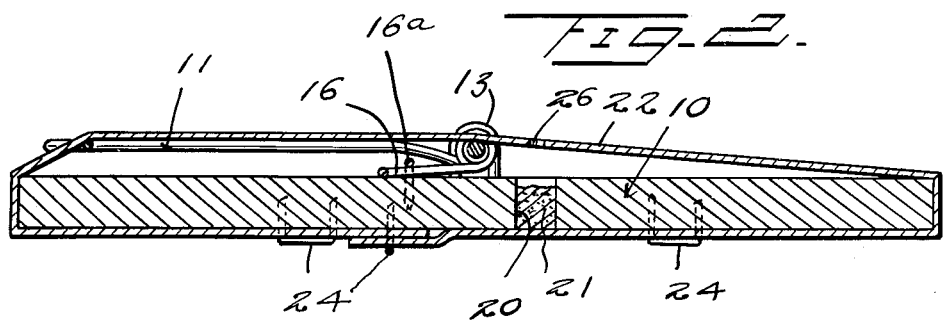
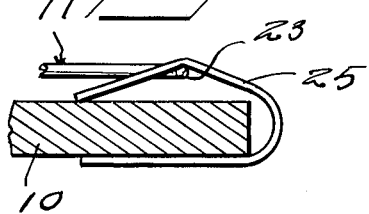
INVENTOR
W. M. Nickey
BY Kimmel & Crowell
ATTORNEYS

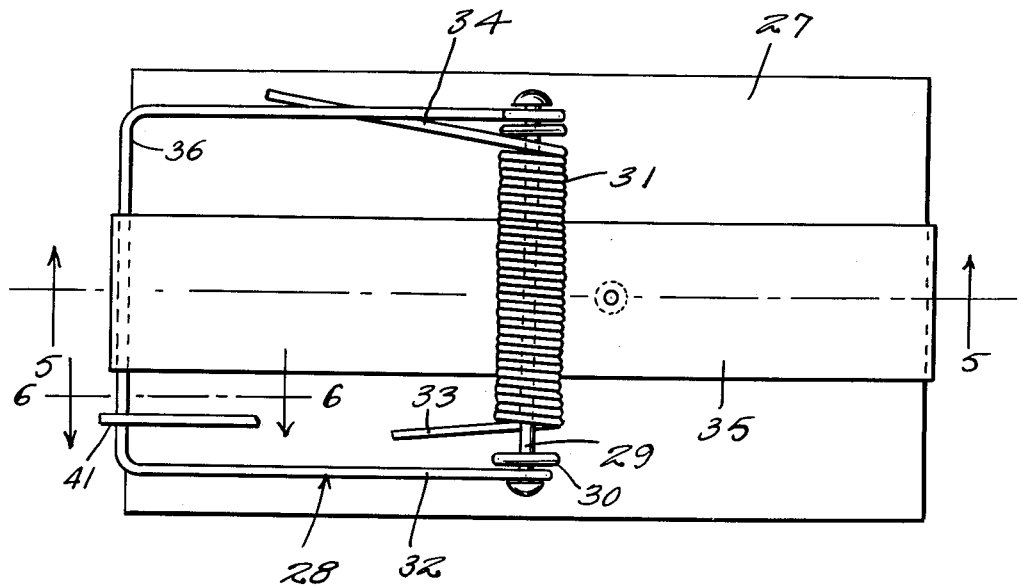
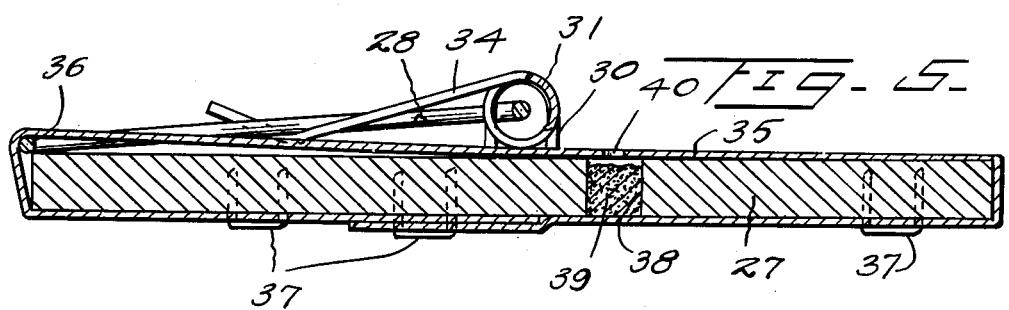
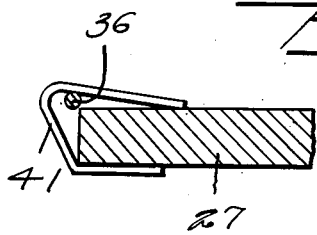

United States Patent Office 2,736,985
    Patented Mar. 6, 1956

2,736,985

MOUSE TRAP

William M. Nickey, Memphis, Tenn.

Application June 25, 1953, Serial No. 363,998

3 Claims. (Cl. 43—81)

This invention relates to mouse traps.

An object of this invention is to provide a mouse trap embodying a spring pressed striker mounted on a base with a tearable or frangible holder for the striker which is adapted to engage over a bait holder so that the animal will have to cut through the tearable holder or band in order to get at the bait, whereupon the striker will swing from its set position to a killing position.

Another object of this invention is to provide a mouse trap which is of the pre-set type in that the trap is pre-set and pre-baited by the manufacturer so that the purchaser of the said trap will not be required to either set or bait the trap. The trap hereinafter described is designed primarily as a one time trap, that is, the trap is designed for catching only one animal which is left caught in the trap and thrown away with the trap.

With the above and other objects in view, my invention consists in the arrangement, combination and details of construction disclosed in the drawings and specification, and then more particularly pointed out in the appended claims.

In the drawings:

Figure 1 is a plan view of a mouse trap constructed according to an embodiment of this invention with a portion of the band broken away.

Figure 2 is a sectional view taken on the line 2—2 of Figure 1.

Figure 3 is a fragmentary sectional view taken on the line 3—3 of Figure 1.

Figure 4 is a plan view of another form of mouse trap.

Figure 5 is a sectional view taken on the line 5—5 of Figure 4.

Figure 6 is a fragmentary sectional view taken on the line 6—6 of Figure 4.

Referring to the drawings and first to Figures 1, 2 and 3 the numeral 10 designates generally a rectangular base which has mounted on the upper side thereof a U-shaped striker or killer 11. The ends of the U-shaped member 11 are pivotally mounted on a pivot pin 12 which is secured to the base at a point midway of the length of the base by means of a pair of staples 13.

A spring generally indicated at 14 is mounted about the pivot member 12 between the sides of the U-shaped member 11 and the spring 14 is formed of a pair of coils 15 connected together by means of a U-shaped connecting member 16. The opposite ends 17 of the spring 14 are extended laterally therefrom and engage in inwardly bent portions 18 of the sides or legs 19 of the U-shaped member 11. Member 16 can be affixed to base 10 by a staple such as 16a.

The U-shaped member 16 is adapted to bear against the upper side of the base 10 so that rearward swinging of the striker 11 will swing the ends 17 of the spring 14 rearwardly and downwardly to a spring tensioning position. The base 10 is formed at a point forwardly of the spring 14 with a recess or socket 20 within which a bait element 21 is adapted to engage. The striker 11 is held in set position by means of a tearable band 22 which engages over the center of the spring 14 and over the bight 23 of the striker 11.

The band 22 is then extended beneath the base 10 and is secured to the lower side of the base 10 by means of staples or other suitable fastening means 24. As shown in Figure 2, the band 22 also extends across the socket 20 for closing the lower end of socket 20. The band 22 is adapted to be applied to the mouse trap by the manufacturer and may be made from a paper strip.

In order to prevent tearing of the band 22 prior to the placement of the trap for catching a mouse or the like, the striker 11 is held in set position by means of a U-shaped clip 25 which engages about the base 10, at one end, and extends over the bight member 23 of striker 11. The band 22 is provided at a point overlying the socket 20 with an opening 26 so that the odor of the bait 21 may pass upwardly through the opening 26 in band 22.

Referring now to Figures 4, 5 and 6, there is disclosed a modified form of this invention embodying a rectangular base or plate 27, which has pivotally mounted on the upper side thereof a U-shaped striker 28. The striker 28 is pivotally mounted on a shaft 29 which is secured by means of staples 30 to the base 27. A coil spring 31 is disposed about the shaft 29 between the parallel legs 32 of the striker 28 and the spring 31 has one end 33 thereof engaging the upper side of the base 27. The other end 34 of the spring 31 extends beneath one of the legs 32 of striker 28 so as to constantly urge striker 28 to swing clockwise as viewed in Figures 4 and 5.

A striker holding band 35 extends over the upper side of base 27 beneath spring 31 and then extends over the bight 36 of U-shaped member 28. The band 35 is then extended beneath the base 27 and is secured thereto by means of staples or other suitable fastening means 37. The base 27 is provided with a recess or socket 38 within which a bait element 39 is positioned, and as shown in Figure 5, one end of band 35 extends across the lower end of socket 38. Band 35 is also provided with an opening 40 overlying the socket 38 so that the odor of the bait may pass upwardly through the band 35.

In order to prevent inadvertent tearing of the band 35 by the striker 28 after manufacture and assembly of the trap in set condition, or prior to the resetting of the trap, a U-shaped clip 41 is engaged over one end of the base 27 as shown in Figure 6 and also is engaged over the bight 36.

In use of this trap, the purchaser of the trap will receive the same, with the clip 25 and 41 in clamping position. The striker holding clip is removed when the trap is placed in position to catch a mouse, leaving the striker 11 and striker 28 held in set position only by the band 22 and band 35 respectively.

The mouse will be attracted to the bait, which is preferably of sufficient odorous character to attract a mouse, so that when the mouse endeavors to get at the bait, the mouse will have to tear through the striker holding band 22 or band 35. As soon as the striker holding band is substantially torn through, the striker operating spring will swing the striker clockwise to a killing position. If desired, the trap may be reused by placing a new paper band about the base after the manner hereinbefore described. However, it is contemplated that this trap be used only once so that where a person is obsessed with a fear of a mouse may throw the trap and the mouse may be thrown away.

What is claimed is:

1. A mouse trap comprising a base plate, a spring pressed striker carried by said plate, said plate having a bait holding socket, a tearable band extending lengthwise over the top of said plate and engaging over said striker for holding said striker in set position, said band overlying said socket, said band projecting over the ends of said plate and extending under the lower side of said plate, and means securing the ends of said band to the lower side of said plate.

2. A mouse trap comprising a base plate, a spring pressed striker carried by said plate, said plate having a bait holding socket, a tearable band extending lengthwise over the top of said plate and engaging over said striker for holding said striker in set position, said band overlying said socket, and a U-shaped clip initially engaging over said striker and an end of said base to relieve the tension of said striker on said band, said band projecting over the ends of said plate and extending under the lower side of said plate, and means securing the ends of said band to the lower side of said plate.

3. A mouse trap comprising a base plate, a spring pressed striker carried by said plate, said plate having a bait holding socket, a tearable band extending lengthwise over the top of said plate and engaging over said striker for holding said striker in set position, said band overlying said socket, said band having an opening overlying said socket whereby the odor of the bait may be diffused to the atmosphere, said band projecting over the ends of said plate and extending under the lower side of said plate, and means securing the ends of said band to the lower side of said plate.

References Cited in the file of this patent

UNITED STATES PATENTS

| | | |
|---|---|---|
| 942,528 | Wilbur | Dec. 7, 1909 |
| 1,491,829 | Stoeffler | Apr. 29, 1924 |
| 1,714,068 | Askin | May 21, 1929 |
| 1,726,367 | Seghers | Aug. 27, 1929 |